2,813,985

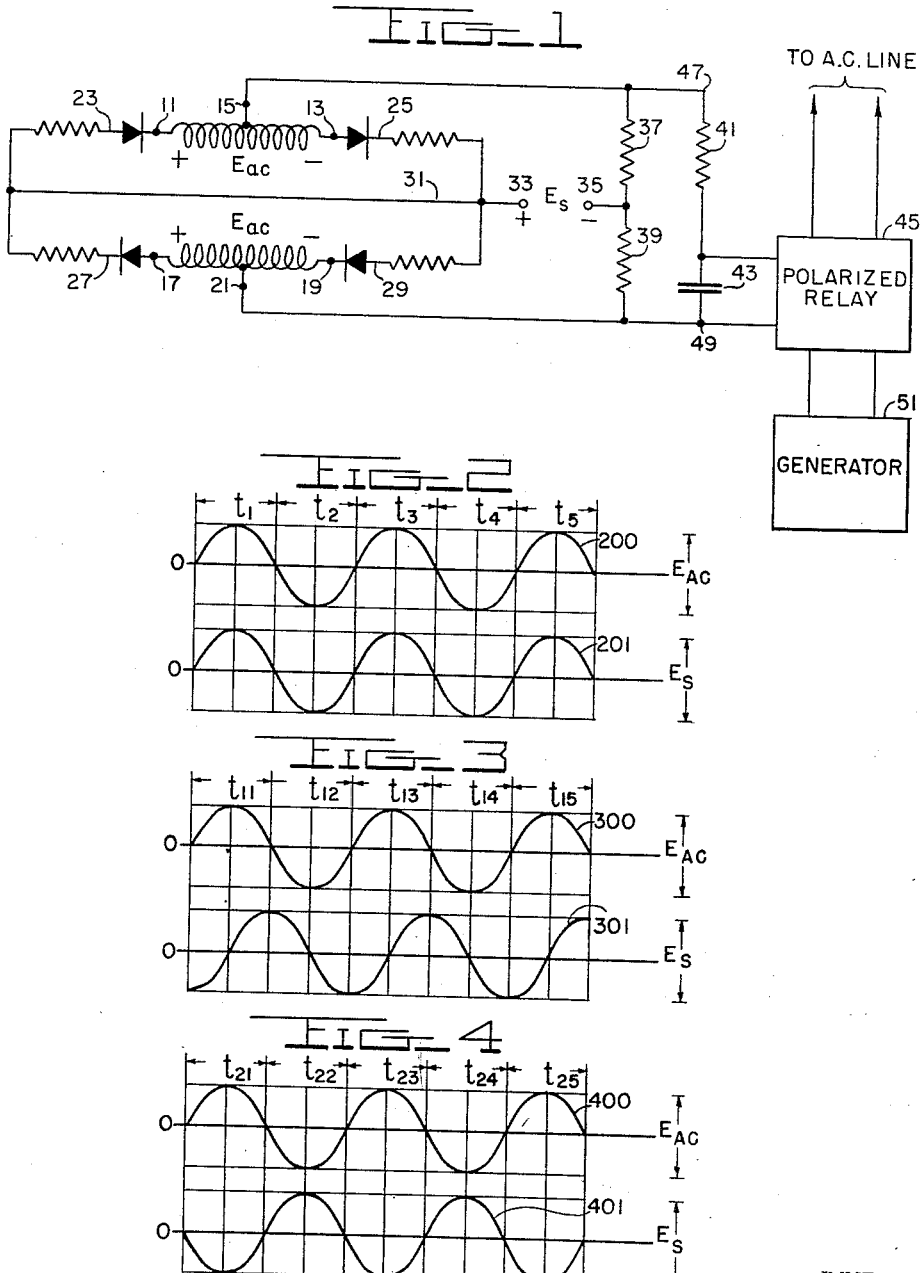

PHASE SENSITIVE DETECTOR FOR MULTIPLE OPERATION OF ALTERNATING CURRENT GENERATORS

Donald G. Scorgie, Pittsburgh, Pa.

Application November 28, 1956, Serial No. 624,955

5 Claims. (Cl. 307—57)

(Granted under Title 35, U. S. Code (1952), sec. 266)

The invention described herein may be manufactured and used by or for the Government of the United States of America for governmental purposes without the payment of any royalties thereon or therefor.

This invention relates generally to apparatus for phase detection. More particularly this invention relates to a modified ring modulator combined with a polarized relay to switch an electrical generator from a line when the generator current leads or lags the line voltage by more than a specified angle.

In electrical power supply systems in which a plurality of generators contribute to the overall power content of a line, it is desirable if not necessary to provide means to disconnect a generator from the line when the power factor of the particular generator drops to a point at which it is actually drawing power from the line rather than supplying power to the line. A lagging current from a generator to the extent of 90° will cause a generator to draw current from the line. It would be particularly convenient if a circuit could be adapted to cut the generator from the line when the generator current lags the line voltage by a specified angle.

It is an object of this invention to provide an electrical power generator switching means.

It is another object of this invention to provide a phase sensing detector for an electrical power generating system.

It is another object of this invention to provide a ring modulator in combination with a polarized relay to switch a generator from the supply line when the generator current leads or lags the line voltage by more than 90°.

It is a further object of this invention to provide a phase sensitive detector employing a ring modulator.

Other objects and many of the attendant advantages of this invention will be readily appreciated as the same becomes better understood by reference to the following detailed description when considered in connection with the accompanying drawings in which like reference numerals designate like parts throughout the figures and wherein:

Fig. 1 of the drawings illustrates a preferred embodiment of the circuitry for a generator switching circuit.

Fig. 2 of the drawings shows the relationship between the line voltage $E_{ac}$ and a voltage proportional to the generator current $E_s$ when they are in phase.

Fig. 3 of the drawings illustrates the relationships of the line voltage $E_{ac}$ and the signal $E_s$ proportional to the generator current when the generator current is lagging the line voltage by 90°.

Fig. 4 of the drawings illustrates the relationship of the line voltage $E_{ac}$ with respect to a voltage proportional to the generator current $E_s$ when the generator current is 180° out of phase with the line voltage $E_{ac}$.

In the apparatus shown in Fig. 1, the rectifier ring comprises in part, rectifier leg 23, rectifier leg 25, rectifier leg 27 and rectifier leg 29. Rectifier leg 23 and rectifier leg 27 are serially connected between terminals 11 and 17. Rectifier leg 25 and rectifier leg 29 are serially connected between terminals 13 and 19. A conductor 31 connects the juncture of rectifier legs 23 and 27 to the juncture of rectifier legs 25 and 29 and to terminal 33. A terminal 35 is connected to the juncture between serially connected resistors 37 and 39. The opposing end of resistor 37 connects to the output terminal 15 and the opposing end of resistor 39 connects to the output terminal 21. Serially connected resistor 41 and capacitor 43 are also connected across the terminals 15 and 21. A polarized relay 45 is connected in series with resistor 41 and in parallel with capacitor 43. Terminals 11 and 13 are connected to a transformer winding having a center tap connected to terminal 15. Likewise terminals 17 and 19 are connected to a second transformer winding having a center tap connected to terminal 21. The transformer windings are energized with alternating current power in such manner as to develop equal voltages $E_{ac}$ in the windings and drive typical terminals 11 and 17 in phase. The signal $E_s$ is applied to terminals 33 and 35 and is derived in such manner as to appear in phase with the generator current. Resistors 37 and 39 divide the voltage drop between terminals 15 and 21. Resistor 41 and capacitor 43 act as a filter circuit to reduce ripple voltage. Polarized relay 45 is shown connected in series with resistor 41 and in parallel with capacitor 43, however, it may be placed anywhere in the output circuit to operate in dependency on the polarity and potential of output voltage. Relay 45 may, for example, be connected to stay closed as long as a positive voltage appears at output terminals 47 and 49 and to disconnect the output of the generator from the supply line when the voltage across the output terminals is zero or negative. This is the case for the preferred embodiment of the present invention.

For an illustration of the theory of operation, reference is made to Figs. 2, 3 and 4 of the drawings in which phase comparisons between voltage $E_{ac}$ and signal $E_s$ are made graphically.

In Fig. 2, waveform 200 represents the variations in the sinusoidal line voltage $E_{ac}$ over a number of cycles and 201 represents the variations of the sinusoidal voltage $E_s$ over the identical time period. For a comparison of voltages $E_{ac}$ and $E_s$ for corresponding time periods, intervals of one-half cycle duration are used. During the interval $t_1$ the area within curve 200 is positive and the area within curve 201 is positive. It has been found that the output polarity of the circuit as produced at terminals 15 and 21 and hence terminals 47 and 49 may be determined by taking a product of the voltage values $E_{ac}$ and $E_s$ taking into consideration the polarities of these voltages. For the interval $t_1$ the net voltage defined by curve 200 is positive and the net voltage defined by curve 201 is positive. The product of the net voltages $E_{ac}$ and $E_s$ for this period is positive. The output appearing at terminals 47 and 49 for the interval $t_1$ will therefore be positive and negative respectively. For time intervals $t_2$ the area within curves 200 and 201 are both negative. The product of the two negative voltage values will be positive and the output polarity at the output terminals will remain the same as for interval $t_1$ with terminal 47 positive and terminal 49 negative. For time intervals $t_3$ and $t_4$, the waveform portions of 200 and 201 are identical with the waveforms for time intervals $t_1$ and $t_2$ respectively. The output polarity will remain positive at terminal 47 and negative at terminal 49 for the "in-phase" condition of voltages $E_{ac}$ and $E_s$ as graphically shown by waveforms 200 and 201.

In Fig. 3 of the drawings, waveform 300 represents the voltage variations in $E_{ac}$ over a number of cycles and waveform 301 represents the voltage variations in $E_s$ over the identical time period. A comparison of the voltages $E_{ac}$ and $E_s$ for a time interval $t_{11}$ indicates that the voltage defined by the portion of waveform 300 is entirely within the positive polarity region while for the same time interval the portion of waveform 301 defines a voltage having a negative polarity for the first one-half portion of time interval $t_{11}$ and a positive polarity for the second one-half portion of the time period $t_{11}$. The net voltage of $E_{ac}$ is a positive value and the net value of $E_s$ for the corresponding time period $t_{11}$ is zero. A product of $E_{ac}$ and $E_s$ for the time interval $t_{11}$ is therefore zero. The output voltage at terminals 47 and 49 will also be zero. A similar comparison of voltages $E_{ac}$ and $E_s$ for time interval $t_{12}$ will show that $E_{ac}$ is negative while voltage $E_s$ is positive for the first one-half of the interval and negative for the second one-half of the interval. The product of the voltage values for time interval $t_{12}$ is again zero and the output voltage of terminals 47 and 49 is again zero. For time intervals $t_{13}$ and $t_{14}$ the analysis is identical to that of time intervals $t_{11}$ and $t_{12}$ respectively and time interval $t_{15}$ is identical to time interval $t_{11}$. For each interval shown in Fig. 3 the product of voltage will be zero. This will be true when the signal $E_s$ lags the voltage $E_{ac}$ by 90°. A similar analysis can be made by interchanging the waveforms of $E_s$ and $E_{ac}$. Such analysis will show that the product of the voltage $E_s$ and $E_{ac}$ will be zero and the output at the terminals 47 and 49 will also be zero.

In Fig. 4, waveform 400 represents the variations in the sinusoidal voltage $E_{ac}$ and 401 represents sinusoidal voltage variations in the signal $E_s$ over a number of cycles. By comparison of the voltages $E_{ac}$ and $E_s$ for time interval $t_{12}$, the net voltage value of $E_{ac}$ is positive in polarity and the net voltage value of $E_s$ is negative in polarity. A product of the two voltages is negative and the output voltage will have a polarity such that terminal 47 will be negative and terminal 49 will be positive. Considering interval $t_{22}$, the area within curve 400 representing $E_{ac}$ is negative and the area within curve 401 representing $E_s$ is negative. Again the product of the voltage values of $E_{ac}$ and $E_s$ is a negative value and the output polarity is such that terminal 47 is negative and terminal 49 is positive. Intervals $t_{23}$ and $t_{24}$ will have voltages $E_{ac}$ and $E_s$ for time intervals $t_{21}$ and $t_{22}$ respectively. Time interval 25 contains voltage values of $E_{ac}$ and $E_s$ identical to the voltage values of $E_c$ and $E_s$ in time interval $t_{21}$. The condition represented by waveforms of Fig. 4 is the phase relationship for either a 180° phase lead or a 180° phase lag of the signal $E_s$ with respect to voltage $E_s$. For a 180° phase difference between $E_s$ and $E_{ac}$ the polarity at terminal 47 will be negative and terminal 49 will be positive. A complete phase reversal is experienced at terminals 47 and 49 when a phase difference of 180° occurs between $E_{ac}$ and $E_s$.

In practical operation, line voltage $E_{ac}$ and signal $E_s$ are applied to the modified modulator circuit, $E_{ac}$ being applied in phase with respect to terminals 11 and 17 and $E_s$ applied in phase with respect to terminal 35. This condition represents the in-phase operation as illustrated graphically by Fig. 2. An output voltage will appear across terminals 47 and 49, with terminal 47 positive and terminal 49 negative. A portion of the output voltage, tapped at terminal 43, appears across the coils of polarized relay 45 keeping the relay energized to keep generator 51 connected to the power line as long as the generator current as represented by $E_s$ is substantially in phase with the line voltage as represented by $E_{ac}$, that is when the phase of signal $E_s$ varies less than 90° from $E_{ac}$.

If the generator current should vary in phase from the line voltage by 90°, a zero output voltage will appear across the coils of polarized relay 45, disconnecting generator 51 from the line. This is the situation demonstrated graphically in Fig. 3 of the drawings.

The generator will remain cut out for any variance in phase of generator current from line voltage greater than 90°. For example, when the generator current varies 180° from the line voltage terminal 47 will be negative and terminal 49 will be positive. The same polarity as across terminals 47 and 49 will appear across the coils of relay 45 and since the relay coils are polarized to keep the contacts closed only when a voltage of a selected polarity and since the voltage now applied is opposite to the selected polarity, the relay will be open and the generator will be disconnected from the line.

Although the relay is set to disconnect at 90° phase difference in the illustrated embodiment of the invention, the relay may be connected and adjusted to operate at any phase difference angle desired.

Obviously many modifications and variations of the present invention are possible in the light of the above teachings. It is therefore to be understood that within the scope of the appended claims the invention may be practiced otherwise than as specifically described.

What is claimed is:

1. A generator switching circuit comprising, a modulator having 4 diodes serially connected having 4 junctures, a first alternating line voltage inserted serially at said first juncture, a second line voltage inserted serially at said third juncture, said second voltage having the same magnitude and frequency as said first voltage, conductor means connecting said second and fourth junctures to a common terminal conductor means connecting center taps to output terminals, resistance means having a center tap connected across said output terminals a voltage source proportional to the current of an alternating current generator applied between the center tap of said resistance means and said common terminal, polarized relay means connecting a generator to a power line, said relay connected to said output terminals and responsive to cut-out the generator from the line upon a change in potential across said output terminals.

2. A phase sensitive detector comprising a modified ring modulator having 4 diodes, a first alternating voltage source connected between said first and second diodes, said first source, a second voltage source having the same frequency phase and magnitude as said first source connected between said third and fourth diodes, said second source having a center tap, conductor means connecting junctures of diodes 1 and 4 and diodes 2 and 3 to a common terminal, conductor means respectively connecting each of said source center taps to an output terminal, means having a center tap connected across said output terminals, a third voltage source connecting between said common terminal and the center tap of said resistance means, a load impedance across said center tap, said first and second voltages operable with said third voltage to produce an output proportional to the phase relation of said third voltage to said first and second voltage.

3. Apparatus for disconnecting a generator from a power line when the generator current differs from the power line voltage by more than a predetermined angle comprising a modified ring modulator having 4 serially connected rectifiers with junctures therebetween, a first center tapped impedance means serially connected between said first and second rectifiers, a second center tapped impedance means connected serially between said third and fourth rectifiers, an alternating line voltage connected across said first and second impedance means, and across said second impedance means in the same polarity, a center tapped resistance means connected across the center taps of said first and second impedance means, conductor means connecting said second and fourth junctures to a common terminal, an alternating current generator, a signal source in phase with the current of said generator connected between the center tap of said resistance means and said common terminal output terminals at each of said impedance center taps respectively, the output across said terminals having a particular potential when the signal is in phase with said line voltage and an opposite potential when said signal is 180° out of phase with said line voltage, a polarized relay connected to the output terminals and to said generator and operable to disconnect the generator from the line when a potential across said output corresponding to said predetermined phase angle is reached.

4. A phase detector comprising a modified ring modulator having 4 serially connected diodes with 4 junctures therebetween, a first center tapped impedance means serially connected between said first and second diodes, a second center tapped impedance means serially connected between said third and fourth diodes, a resistance means having a center tap, said resistance means connected between the center tap of said first impedance means and the center of said second impedance means, output terminals connected to the center taps of said first and second impedance means, D. C. ripple filter means in parallel with said resistance means, a common terminal connecting second and fourth junctures of said ring modulator, a signal source connected between said common terminal and said resistance center tap, said circuit operative to produce an output voltage varying from a positive polarity when said signal source is in phase with said voltage source to a negative potential when said signal source is 180° out of phase with said voltage source.

5. A phase detector comprising a modified ring modulator having 4 serially arranged diodes, a first center tapped impedance means serially connected between the first and second diodes of said modulator, a second impedance means serially connected between the third and fourth diodes, a first juncture connecting said second and third diodes, a second juncture connecting said first and fourth diodes, conductor means connecting said first and second junctures to a common terminal, conductor means connecting the center taps of said first and second impedance means to a first and second output terminal respectively, a center tapped resistance means connected said first and second output terminals, D. C. ripple filter means connected between said first and second output terminals, a first alternating voltage source applied across said first and second impedance means in serial phase opposition, a signal source applied between the center tap of said resistance means and said common terminal, said modulator operative to produce a voltage varying from a positive potential at said first output terminal when said signal source is in phase with said voltage source to a negative potential at said first output terminal when said signal source is 180° out of phase with said voltage source.

No references cited.